(12) United States Patent
Charriere et al.

(10) Patent No.: US 8,039,574 B2
(45) Date of Patent: Oct. 18, 2011

(54) METHOD FOR THE PREPARATION OF LOW-VISCOSITY (POLY) ISOCYANATES

(75) Inventors: Eugènie Charriere, Lyons (FR); Jean-Marie Bernard, Mornant (FR); Denis Revelant, Genas (FR); Stéphane Randu, Lyons (FR); Michel Carlo, Lyons (FR)

(73) Assignee: Rhodia Chimie, Courbevoie Cedex (FR)

( * ) Notice: Subject to any disclaimer, the term of this patent is extended or adjusted under 35 U.S.C. 154(b) by 0 days.

(21) Appl. No.: 10/682,412

(22) Filed: Oct. 10, 2003

(65) Prior Publication Data
US 2004/0106762 A1    Jun. 3, 2004

Related U.S. Application Data

(63) Continuation of application No. 09/485,533, filed as application No. PCT/FR98/01800 on Aug. 12, 1998, now abandoned.

(30) Foreign Application Priority Data

Aug. 12, 1997    (FR) ...................................... 97 10296
May 29, 1998     (FR) ...................................... 98 06849

(51) Int. Cl.
*C08G 18/79*    (2006.01)
*C08G 18/42*    (2006.01)
*C08G 18/62*    (2006.01)
*C08L 75/06*    (2006.01)
*C07D 229/00*   (2006.01)

(52) U.S. Cl. .................. 528/73; 252/182.2; 252/182.21; 252/182.22; 525/123; 525/440; 525/455; 528/45; 528/67; 528/80; 540/202; 548/951; 548/952; 560/335; 564/38

(58) Field of Classification Search ............... 252/182.2, 252/182.21, 182.22; 525/123, 440, 455; 528/45, 67, 73, 80, 952; 540/202; 544/193, 544/222; 548/951, 952; 560/335; 564/38
See application file for complete search history.

(56) References Cited

U.S. PATENT DOCUMENTS
5,461,135 A   10/1995   Malofsky et al.
5,663,274 A    9/1997   Lee et al.

FOREIGN PATENT DOCUMENTS
EP         325941 A2 *  8/1989
EP         0 481 318    4/1992
EP         0 615 993    9/1994
EP         0 780 417    6/1997

* cited by examiner

*Primary Examiner* — Rabon Sergent
(74) *Attorney, Agent, or Firm* — Buchanan Ingersoll & Rooney, P.C.

(57) ABSTRACT

A low viscosity polyisocyanate composition containing at least one isocyanate dimer having a uretidinedione unit is prepared from a reaction medium containing at least one isocyanate monomer in which the isocyanate groups are borne by $sp^3$ carbon atoms. The reaction medium is heated, in the absence of a dimerization catalyst, to a temperature of at least 50° C. and not more than 200° C. for a period of not more than 24 hours.

7 Claims, No Drawings

METHOD FOR THE PREPARATION OF LOW-VISCOSITY (POLY) ISOCYANATES

This application is a continuation application of U.S. application Ser. No. 09/485,533, filed on Jun. 9, 2000, now abandoned, which was the National Stage of International Application No. PCT/FR98/01800, filed Aug. 12, 1998.

The present invention relates to the preparation of low-viscosity polyfunctional isocyanates from starting monomers.

These products are most particularly of interest to the paints and coatings industry and are particularly advantageous in ecological terms.

It is known to use polyfunctional isocyanates for the preparation of crosslinked polymers, in particular polyurethanes, by polymerization and/or polyaddition with compounds containing reactive hydrogen, in particular polyols.

For this, it is generally preferred to use polyfunctional isocyanate compositions comprising a large amount of tricondensate polyfunctional isocyanates (TPIs), i.e. isocyanates obtained by (cyclo)trimerization of three starting monomer molecules, namely isocyanates, in particular diisocyanates and optionally other compounds that are reactive with an isocyanate, such as an amine, in the presence of water.

Among the TPIs, mentioned may be made in particular of the (poly) isocyanate isocyanurates obtained by cyclotrimerization of three isocyanate molecules, advantageously diisocyanates, or (poly)isocyanates containing biuret units, obtained by a biuretization process such as trimerization with three isocyanate molecules, in the presence of water and a catalyst as described in FR 2,603,278.

In order to obtain isocyanate compositions comprising large proportions of TPI, the reaction to polymerize the starting monomers, which generally takes place in the presence of a suitable catalyst, is generally stopped when a degree of conversion of 20 to 40% of the starting monomers is obtained, in order to prevent an excessive amount of oligomers with more than three starting monomer units being formed in the reaction medium.

At the end of the polycondensation, the reaction medium thus obtained generally contains a major amount of monomers and a minor amount of oligomers, the oligomer fraction consisting mainly of trimers and, in smaller amounts, tetramers, pentamers and heavy compounds, as well as a small amount of dimers.

At the end of the reaction, the reaction mixture is distilled in order to eliminate the monomers, which are volatile organic compounds and some of which are toxic.

A major drawback of the compositions obtained in this manner lies, however, in the fact that the composition obtained after the distillation step has a relatively high viscosity, which is essentially incompatible with the subsequent use of these compositions for the manufacture of coatings.

Thus, in the absence of solvent, a composition obtained by cyclotrimerization of hexamethylene diisocyanate (HDI) generally has, after distillation of the monomer fraction, a viscosity ranging from 1200 to 2400 mPa·s for a degree of conversion of the starting monomers ranging from 20 to 40%.

This problem is even more acute for biurets, which, for the same monomer, have, after distillation, a viscosity of about 9000 mPa·s.

One of the solutions recommended to lower the viscosity of these compositions is to add organic solvents.

However, environmentalist pressure and the regulations have forced paint manufacturers to reduce the amounts of volatile solvents in paints.

It has thus been sought to introduce so-called reactive solvents which become incorporated into the network of the coating film.

Thus, low-viscosity isocyanate oligomers have been used as reactive diluents. Mentioned may be made, in this respect, of the diisocyanate dimers also known as uretidinediones (uretdiones). One specific example consists of the dimer containing a uretidinedione ring, obtained by catalysed dimerization of hexamethylene diisocyanate (HDI) which is used as a reactive diluent for polyisocyanates, as described in the presentation by Wojcik R. P., Goldstein S. L., Malofsky A. G., Barnowfki, H. G., Chandallia K. R. at the 20th congress "Proceedings Water borne, Higher Solids and Power Coatings Symposium", 1993 (pp. 26-48) or the presentations by U. Wustmann, P. Ardaud and E. Perroud at the 4th congress in Nuremberg "Creative Advances Coatings Technology", April 1997, presentation No. 44.

In order to obtain the low-viscosity polyfunctional isocyanate compositions, the dimer is generally added to the isocyanate composition obtained from the polymerization, in particular from the (cyclo)trimerization of the starting monomers, which necessitates the use of two preparation processes, one specific for the preparation of the dimer compounds, the other specific for the preparation of the TPIs, thereby entailing two distillation processes for the resulting reaction mixtures in order to remove the starting monomers.

Processes for preparing dimers are known in the prior art, and reference will be made in particular to the article by W. Schapp in "Methoden der Organischen Chemie", Houben-Weyl, 1903, pp. 1102-1111 for the details of the various modes of preparation.

Until now, use has been made of catalysts to carry out the synthesis of isocyanate dimers, in particular of aliphatic isocyanates.

The catalysts generally used for this purpose are phosphine derivatives and aminopyridine derivatives, optionally supported on inorganic compounds such as alumina or silica, described in U.S. Pat. No. 5,461,020, organometallic derivatives or alternatively derivatives of tertiary amine type, in particular polydialkoylamino-pyridines as described in U.S. Pat. No. 5,315,004 and WO 93/19049.

It is also known to use mixtures of various catalysts.

One drawback in the use of dimerization catalysts is that they give the dimer produced a coloration which is detrimental to the subsequent use of the polyfunctional isocyanate compositions, in particular in paints.

In order to combat this coloration, decolorizing agents such as peroxides are used.

Another major drawback of the known processes for the synthesis of the dimer lies in the impossibility of obtaining a quantitative degree of conversion of the starting monomers since, as the dimerization reaction is unselective, the starting isocyanate monomers have a tendency to homopolymerize and to give products of higher molecular weight, thereby resulting in an increase in viscosity.

It is thus common to limit the degree of conversion of the starting isocyanate so as not to exceed a degree of 50%, or even 35%, in order to avoid the formation of viscous or even solid compounds which would no longer be able to act as TPI diluents.

An additional problem in the preparation of the isocyanate dimers also relates to their separation from the monomers, since, at the end of the dimerization reaction, the excess isocyanate monomers need to be removed. This operation is carried out by volatilization or distillation under vacuum. The dimer thus obtained is a relatively non-viscous compound, of 100 mPa·s at 25° C.

However, the dimer thus obtained is not stable over time, even at room temperature. Indeed, the dimer produced redissociates into monomers until an equilibrium is formed between the dimer form and the monomer form. This effect is moreover promoted by the temperature. This problem is particularly pronounced when the dimer is pure.

Now, the polyurethane paints industry requires polyisocyanates with very low contents of isocyanate monomers, of less than 0.5% by weight.

It would consequently be necessary to distil the dimer at regular intervals in order to remove the excess monomers, but this incurs additional costs and a fall in production efficiency.

The aim of the invention is consequently to provide a process for the preparation of low-viscosity isocyanate dimers which are stable over time and have neither any harmful coloration (Hazen number of less than 100, advantageously less than 50) nor any traces of catalyst.

In particular, the dimers will contain less than 1%, preferably less than 1000 ppm, more preferably less than 100 ppm, by mass of catalytic phosphorus (directly or after destruction of the catalyst) of phosphinic nature or in its inactivated form (phosphine oxide, phosphonium salts, etc.).

However, the composition containing the dimer can comprise surfactant-type phosphorus compounds which have no catalytic activity with respect to the dimerization, especially phosphates, phosphinates and phosphonates, in particular those described in EP 0,815,153.

The dimers will also contain less than 5 meq, advantageously less than 1 meq and more preferably less than 0.5 meq, of aminopyridine or alkylaminopyridine functions per 100 g of oligomers derived from the starting isocyanate.

Advantageously, the compositions according to the invention do not comprise any measurable (by the usual measuring means) amounts of catalyst.

The inventors' studies have now made it possible to establish a process which makes it possible to overcome the drawbacks of the prior art and to obtain stable, dimer compositions with no coloration.

The subject of the invention is thus a process for the preparation of a composition comprising at least one isocyanate dimer containing a uretidinedione unit, from starting isocyanate monomers, characterized in that the starting reaction medium is heated, in the absence of dimerization catalyst, to a temperature of at least 50° C. and not exceeding 200° C. for a period not exceeding 24 hours, until a dimer content of at least 1%, preferably 2% by weight relative to the starting monomers is obtained.

The expression "absence of dimerization catalyst" is understood to mean in particular that the reaction is carried out in the absence of compounds of phosphine, aminopyridine, phosphoramide (in particular hexamethyl phosphoramide), organometallic or tertiary amine type.

Advantageously, the heating temperature is at least 80° C., preferably at least 120° C., and not more than 170° C.

The heating temperature depends on the nature of the starting isocyanate monomers.

When the starting monomers are of aliphatic nature, the heating temperature is in the upper region of the range defined above, whereas, when the starting monomers are of aromatic nature, the heating temperature can be brought down to the lower region of this range.

Thus, in order to obtain aliphatic isocyanate dimers, the reaction medium will be heated to a temperature above 100° C., advantageously above 120° C., preferably above 130° C. and more preferably above 140° C., for periods of less than 12 hours, advantageously less than 8 hours and advantageously more than 30 minutes.

In general, the starting isocyanate monomers which it is desired to dimerize consist of any type of isocyanate, either aliphatic, cyclic or aromatic, containing one or more isocyanate groups. However, diisocyanates and triisocyanates are preferred. Among these, those of aliphatic nature are particularly preferred.

The term aliphatic isocyanates is understood to refer to any compound in which the open bonds (those linking the carbon atoms to an isocyanate function or derivative, in particular carbamate, biuret or allophanate) are borne by a carbon of $sp^3$ configuration, including arylaliphatic or acyclic isocyanates, and/or any compound which can contain one or more heterocycles. They preferably comprise less than 30 carbon atoms.

Mention may be made in particular of isocyanates comprising a (poly)methylene chain containing from 1 to 30, advantageously from 2 to 12 and preferably from 4 to 8 —$CH_2$— units.

These are in particular tetramethylene, hexamethylene or octamethylene groups.

Mention may also be made of isocyanates containing a group consisting of a branched homologue of the above groups, in particular the 2-methylpentylene group.

Mention may also be made of isocyanates containing a cycloalkyl or arylene group.

The preferred isocyanate monomers are in particular the following:
1,6-hexamethylene diisocyanate,
1,12-dodecane diisocyanate,
cyclobutane 1,3-diisocyanate,
cyclohexane 1,3- and/or 1,4-diisocyanate,
1-isocyanato-3,3,5-trimethyl-5-diisocyanato-methylcyclohexane (isophorone diisocyanate, IPD),
2,4- and/or 2,6-hexahydrotoluylene diisocyanate,
hexahydro-1,3- and/or -1,4-phenylene diisocyanate,
perhydro-2,4'- and/or -4,4'-diphenylmethane diisocyanate,
1,3- and/or 1,4-phenylene diisocyanate,
2,4- and/or 2,6-toluylene diisocyanate,
diphenylmethane 2,4'- and/or 4,4'-diisocyanate,
triphenylmethane 4,4',4"-triisocyanate,
1,3-bis(isocyanato)methylcyclohexane,
norbornane diisocyanate (NBDI).

The heating time is advantageously not more than 5 hours, and at least 5 minutes, preferably at least 30 minutes.

The reaction can be carried out in the absence or presence of a solvent. It is generally preferred to carry it out in the absence of solvent.

After removing the monomers by distillation, more or less pure dimer is obtained, which is in particular free of compounds containing an isocyanurate unit.

The process of the invention can be optimized by heating the reaction mixture along a decreasing temperature gradient, in order to shift the dimer/monomer(s) equilibrium in the direction of formation of the dimer.

In accordance with the process of the invention, it is also possible to prepare isocyanate dimers continuously, by removing the unreacted starting monomers and recycling them into the dimerization step. Pure, colourless dimeric products free of additive or catalyst can thus be obtained, which can then be:
added to a pure polyfunctional isocyanate composition (i.e. one containing no starting monomers) or to a paint or coating composition, in particular one of polyurethane type, containing at least one diisocyanate or one polyisocyanate and a compound comprising a function which is reactive with the isocyanate function(s) of the isocyanate, in particular an alcohol or a polyol, a primary, secondary or even tertiary amine, or any other compound of this type which is known to those skilled in the art;

added to a crude polyfunctional isocyanate composition obtained by polycondensation of starting monomers and containing unreacted monomers, in order to form a mixture on which is carried out a polycondensation, polymerization, oligomerization, carbamatation or allophanatation reaction, or a crosslinking reaction with a compound containing a function which is reactive with the isocyanate function in order to obtain a composition containing isocyanate dimer and compounds with functionality of greater than 2, of different nature from the starting composition, followed by a step of removal of the monomers.

In all the cases featured, the monomer(s) forming part of the structure of the dimer(s) can be identical to or different from the monomer(s) used to prepare the polyfunctional isocyanate composition.

The dimers according to the invention can be obtained from a single monomer or a mixture of different monomers. The dimer can also be prepared from one or more monomers in order to obtain a dimer which will be a homodimer (symmetrical dimer) when it is obtained from identical isocyanate monomers, or a heterodimer (mixed dimer) in the opposite case, and the dimer thus obtained can be mixed with one or more other different homodimers or heterodimers.

The process according to the invention is particularly advantageous since it does not require the use of a dimerization catalyst of the type mentioned above, in particular of the phosphine or dialkylamino-pyridine type, which are compounds that are generally toxic or harmful to man and present, for the phosphines in particular, risks of flammability.

The process of the invention also makes it possible to carry out several reactions in sequence while at the same time leading, in a cost-effective manner, to polyfunctional isocyanate compositions of diverse structure having a substantially lower viscosity than the same compositions containing no isocyanate dimer(s).

By virtue of the inventors, studies, it has also been possible to observe that the dimerization reaction can be promoted when a polyhydroxylated compound is added to the reaction medium, this compound having the general formula I:

in which:

R is a mono- or n-valent hydrocarbon-based group having from 1 to 30, advantageously from 1 to 18, carbon atoms, preferably from 1 to 6 and more preferably from 1 to 4 carbon atoms and hydrogen atoms, in which the hydrocarbon-based chain can be interrupted by one or more chalcogen atoms, advantageously light chalcogens (O, S), and can bear 1 to 3 OH groups, R advantageously being a group chosen from a $C_1$-$C_4$ alkyl group which can be interrupted by an oxygen or sulphur atom and/or optionally substituted with 1 to 3 OH groups, or a residue derived from silylation reactions of pentaerythritol, R preferably being a $C_1$-$C_4$ alkyl group optionally substituted with an OH group or an ethyl or hydroxymethyl group, n is an integer ranging from 1 to 3, and/or products derived from the compound of general formula I by reaction with a compound bearing an isocyanate function, which is preferably aliphatic.

The products derived from the compound of general formula I defined above can in particular correspond to formulae II and/or III below:

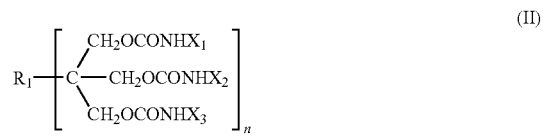

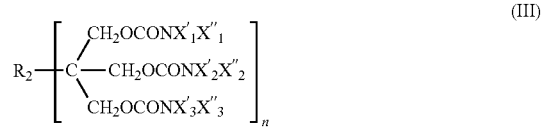

in which one or more of $X_1$, $X_2$ and $X_3$ represents groups $R'$—$(N=C=O)_p$ in which $R'$, which may be identical or different, are p-valent aliphatic groups, i.e. groups whose open bonds (those linking the carbon atoms to an isocyanate function or derivative, in particular carbamate, biuret or allophanate) are borne by a carbon of $sp^3$ configuration, including arylaliphatic or acyclic groups and/or groups which can contain heterocycles and/or, in particular when p=0, carbamate, biuret and/or isocyanurate groups, $R'$ preferably containing from 3 to 30 carbon atoms, and p is an integer, which varies according to the degree of polymerization of the reaction mixture, in general between 0 and 5, advantageously equal to 1 or 2, preferably equal to 1, in which case $R'$ is a divalent group as defined above, the others representing, where appropriate, a group of formula

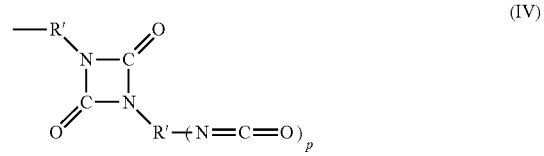

$R'$ and p being as defined above, $R_1$ being R, with the OH groups substituted, where appropriate, with a group $CONX_1H$, $X_1$ being as defined above, n is an integer ranging from 1 to 3; and at least one of $NX'_1X''_1$, $NX'_2X''_2$ and $NX'_3X''_3$ represents the group

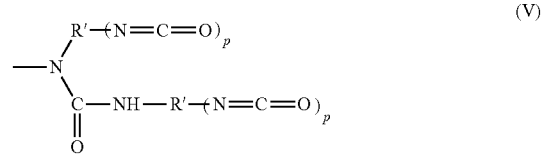

$R'$ being as defined above, the others representing a group $NX_1H$ or $NX_1$-silyl with $X_1$ as defined above, the silyl group originating, where appropriate, from the destruction of the catalyst of silazane type, in particular as defined in EP 89297, and $R_2$ being R, with the OH groups substituted, where appropriate, with a group $CONX_1H$, or

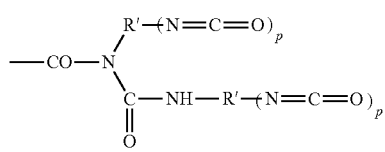

R' being as defined above, and
n is an integer ranging from 1 to 3.

R' can be of any nature since it is not involved in the polymerization reaction. In general, R' is the hydrocarbon-based group of an isocyanate as defined above for the starting isocyanate monomers. However, for practical purposes, groups R' having from 1 to 30 carbon atoms are preferred.

Preferably, R' is a divalent group as defined above, with p equal to 1.

Mention may be made in particular of hexamethylene, tetramethylene, norbornylene and bis-cyclohexylenemethane divalent groups and the divalent radical derived from IPDI.

When it is added to the reaction medium, the compound of general formula I allows the preparation, with high selectivity, of isocyanate dimers containing a uretidinedione unit, from isocyanate monomers, in particular from diisocyanates, the degree of conversion of the isocyanate functions advantageously being at least 5%, preferably at least 10%.

The compounds of general formula I, II and/or III can also be used as prepolymers.

In addition, the compounds of general formula I, II and/or III, advantageously II or III, preferably III, have a function which stabilizes the isocyanate dimers.

The compounds of general formulae II and III can be and are generally obtained by reaction of the compound of general formula I with an isocyanate of general formula VII:

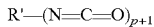 (VII)

in which R' and p are as defined above.

In particular, the group R' is the hydrocarbon-based group derived from an isocyanate, in particular a di- and/or triisocyanate, preferably an aliphatic one as defined above.

The reason for this is that the inventors of the present invention have observed that when a compound of general formula I as defined above is reacted with an isocyanate, a certain proportion of compounds of general formula II and/or III as defined above is generally formed, these compounds in turn promoting the dimerization reaction of the starting diisocyanates.

The compounds of general formula I and/or II and/or III are used in an effective amount for ensuring stabilizing activity, and preferably with a ratio: isocyanate functions/hydroxyl functions, of greater than 4, preferably greater than 20.

Advantageously, pentaerythritol or trimethylolpropane is used as polyhydroxylated compound of general formula I and the corresponding carbamates and/or allophanates obtained by reacting pentaerythritol or trimethylolpropane with an isocyanate, in particular a diisocyanate and advantageously HDI, is used as compound of general formula II and/or III.

It was known practice, from U.S. Pat. No. 5,115,071, to use polyhydroxylated compounds, in particular trimethylolpropane, for the preparation of prepolymers by polycondensation with aliphatic diisocyanates at a temperature of between 0 and 120° C. However, that document makes no mention of the production of dimers. In addition, it indicates most particularly that a person skilled in the art will take the necessary precautions to ensure that the products obtained are free of contaminating products such as allophanates, oligomers and other products.

In contrast, the inventors of the present invention have found that, under the conditions for using a polyhydroxylated compound of general formula I as defined above, according to the present invention, for the production of dimers formed by condensation of two starting isocyanates, a certain amount of allophanate compounds are formed.

Pentaerythritol is particularly preferred since, especially when it is in allophanate form, it makes it possible to obtain high functionalities (which can be up to 8 or more) with reduced viscosity.

When it is used for this purpose, it is desirable for its concentration in the reaction mixture to be at least 10%, advantageously at least 20%, and not more than 90%, advantageously 80%, by mass relative to the mass of the reaction mixture.

For certain applications, in particular when the reduction in viscosity must be large, it is preferred, however, not to use a compound of general formula I to III as defined below.

When a polyhydroxylated compound of general formula I is used, as well as carbamates of general formula II and allophanates of general formula III of the invention, it is advantageous to work at a temperature of greater than 110° C. and preferably greater than 130° C., and preferably not more than 180° C., and for a reaction time of between 1 hour and 1 day, the reaction temperature advantageously being chosen so as to be above the dissolution temperature, where appropriate, of the polyol of general formula I or, where appropriate, of the compounds of general formulae II and III, the dissolution temperature being the temperature at which at least 1 g/l of reagent is dissolved per isocyanate composition.

The compounds of general formula I, II or III can be added as they are into the reaction medium comprising the isocyanate monomers, which may be the same or different, preferably in the absence of solvents, or they can be bound (including by absorption) to a support, in particular a resin.

When a compound of formula I is added, the compounds of general formula II and/or III can be formed spontaneously after a sufficient reaction time.

It is also possible to add to the reaction medium a compound of general formula II and/or a compound of general formula III.

Another subject of the invention consists of processes for the preparation of polyfunctional isocyanate compositions using, in one of their steps, the process for the preparation of isocyanate dimers according to the invention.

Thus, in a first variant, the subject of the invention is a process for the preparation of a low-viscosity polyfunctional isocyanate composition containing at least one isocyanate trimer containing an isocyanurate and/or biuret unit and at least one isocyanate dimer containing a uretidinedione unit, from starting isocyanate monomers, and optionally from other monomers, this process comprising the following steps:

i) the starting reaction medium is heated, in the absence of dimerization catalyst, to a temperature of at least 50° C., advantageously of at least 80° C., preferably of at least 120° C., and of not more than 200° C., advantageously of not more than 170° C., for a period of less than 24 hours, advantageously of less than 5 hours;

ii) the reaction mixture from step i) containing unreacted monomers is reacted with a (cyclo)trimerization or (cyclo)condensation catalyst, under (cyclo)trimerization or (cyclo)condensation conditions;

iii) the unreacted starting monomers are removed from the reaction mixture from step ii);

iv) the low-viscosity polyfunctional isocyanate composition comprising at least one isocyanate trimer and at least one isocyanate dimer is isolated.

Advantageously, a compound of general formula I is added to step i).

According to a second variant, the subject of the invention is also a process for the preparation of a polyfunctional isocyanate composition containing at least one isocyanate trimer containing an isocyanurate and/or biuret unit and at least one isocyanate dimer containing a uretidinedione unit, from starting isocyanate monomers, and optionally from other monomers, comprising the following steps:

i) the starting monomers are reacted with a (cyclo)trimerization or (cyclo)condensation catalyst under (cyclo)trimerization or (cyclo)condensation conditions;

ii) the reaction mixture from step i) containing unreacted isocyanate monomers is heated, in the absence of dimerization catalyst, to a temperature of at least 80° C., advantageously of at least 120° C., preferably of at least 130° C., and of not more than 200° C., advantageously of not more than 170° C., for a period of less than 24 hours, advantageously less than 5 hours;

iii) the unreacted starting monomers are removed from the reaction mixture from step ii);

iv) the low-viscosity polyisocyanate composition comprising at least one isocyanate trimer and at least one isocyanate dimer is isolated.

If it is desired to add a compound of general formula I as defined above, it is preferable to add it to step ii) or i).

When the starting monomers are isocyanates of general formula VII as defined above, the following are obtained in particular:

by cyclotrimerization, trimers containing an isocyanurate ring, of general formula VIII:

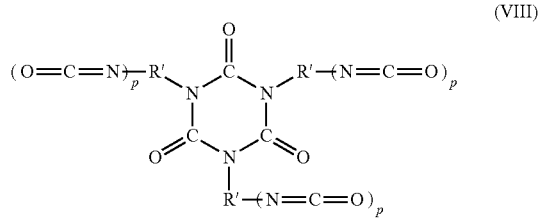

in which R' and p, which may be the same or different, are as defined above, p preferably being equal to 1, by biuretization, compounds containing a biuret unit, the biuret unit being represented by the general formula IX below:

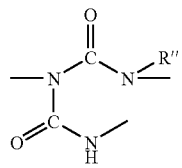

with R" representing H or a hydrocarbon-based residue and dimers containing a uretidinedione ring, of general formula X:

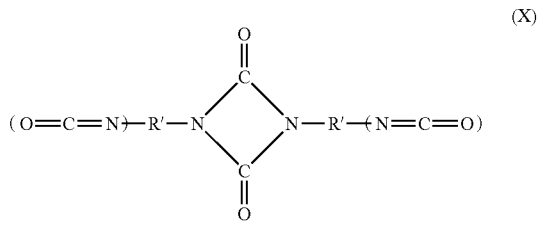

in which R' and p, which may be the same or different, are as defined above.

The trimer containing an isocyanurate unit can be synthesized in any way known to those skilled in the art, but specific mention should be made of processes which use alcohols, in particular as co-catalysts (see in particular the techniques targeted by patent application FR 2,613,363 and in the documents cited therein, in particular U.S. Pat. No. 4,324,879). In this case, the compounds of general formula I, II and/or III can, admittedly, be used simultaneously with the trimerization catalyst. However, this approach is not very successful since there is a risk of the dimer formed being converted into a trimer by the said catalyst. Thus, it is preferred not to add the compound of general formula I, II and/or III according to the invention until after the sail trimerization catalyst has been destroyed. In the case of the process described in particular in patent application EP 89297, the compounds of formula I, II or even III are, however, advantageously used to destroy the trimerization catalyst. In this case, the alcohols and/or carbamates derived therefrom can be used as agents for destroying the catalyst compound, which then silylates some of the alcohol functions of the compound of general formula I, II or even III according to the invention and/or carbamates derived therefrom.

If it is desired to prepare trimers containing an isocyanurate function, in particular from diisocyanate monomers, the trimerization reaction is stopped when the desired degree of conversion of the diisocyanate monomers, essentially into trimers, is obtained and the compound(s) of general formula I and/or II and/or III of the invention is (are) added to the reaction medium as defined above.

The inventors have also determined that when the trimerization catalyst used is a disilazane or an aminosilyl derivative, for example hexamethyldisilazane, it is destroyed by simple addition of a polyhydroxylated compound of general formula I of the invention, in particular when this compound is pentaerythritol.

Thus, after adding the compounds of general formula I and/or II and/or III of the invention, the reaction is carried out until the desired viscosity is obtained, corresponding to a determined dimer content, or more generally until the desired dimer content is obtained.

The reaction according to the present invention has a unique characteristic when compared with the other dimerization reactions, this characteristic being that it has a very low production of trimers.

Thus, for the preparation of mixtures of HDI dimers and trimers according to the two variants outlined above, the reaction is advantageously carried out for a period of about 1 h 30 at a temperature of about 150° C., such that the dimers/trimers ratio is from about ⅙ to ⅓.

At the end of the reaction, polyisocyanate dimers of general formula X, optionally trimers of general formula VIII and/or biurets are found in the reaction medium, in particular when the dimerization is carried out using a reaction medium comprising polyisocyanate trimers of general formula VIII and/or biurets, carbamates, in particular carbamates of general formula II formed between the hydroxylated compounds of general formula I of the invention and the diisocyanate monomers of general formula II and/or allophanates of general formula III, in particular allophanates formed between the said polyhydroxylated compound of general formula I and the diisocyanate monomers of general formula II.

The composition thus formed is also characterized in that it is free of dimerization catalyst, in particular of the type such as phosphine, aminopyridine, phosphoramide (in particular hexamethylphosphoramide), organometallic and tertiary amine.

The composition according to the invention preferably comprises compounds of formula II in which all of the groups $X_1$, $X_2$ and $X_3$ represent R'N=C=O with R' being identical or different, and/or compounds in which one or two of $X_1$, $X_2$ and $X_3$ represents the group of general formula IV, the others being —R'—N=C=O with R' being identical or different.

Preferably, in the compounds of formula III, only one of the groups $NX'_1X''_1$, $NX'_2X''_2$ and $NX'_3X''_3$ represents the group of formula V, the others representing the group $NX_1H$, $X_1$ being as defined above.

The products obtained after removal of the starting monomers are of low viscosity.

For the purposes of the present invention, the term "low viscosity" is understood to refer to (poly)isocyanate compositions comprising a dimer containing a uretidinedione ring and having a viscosity at 25° C. which is at least 20% lower, advantageously at least 30% lower, preferably at least 50% lower than the same polyisocyanate composition comprising no isocyanate dimer as mentioned above.

The polyfunctional isocyanate compositions of the invention are thus characterized in that they contain at least one polyisocyanate with functionality of greater than two and an isocyanate dimer containing a uretidinedione ring, having at least two isocyanate functions, the latter being obtained by a thermal reaction in the absence of specific dimerization catalysts, optionally in the presence of a compound of general formula I, II and/or III.

In the compositions of the invention, it is moreover observed that the amount of dimer formed is in equilibrium with the other polyisocyanate molecules of the composition. The isocyanate composition is thus stable over time and does not require regular rectification in order to remove the monomers which would be formed by dissociation of the dimer.

In particular, the stability is proportionately greater the more the following conditions are respected for the composition:

true dimer units total of the isocyanate functions ≦30%.
Advantageously this ratio is less than 15%, preferably less than 12% (mass/mass).

It is preferably greater than 3.5%, advantageously 5%, in the case of the isocyanurates.

The true dimers are the compounds of general formula X above.

The advantage of the processes for the preparation of polyfunctional isocyanate compositions of the invention also lies in that they require only one operation to remove the starting monomers, in order to obtain a polyfunctional isocyanate composition of low viscosity.

Another advantage of the process of the invention is that it allows the degree of conversion of the monomers to be increased for relatively low viscosities.

Typically, for a degree of conversion of 53%, the viscosity of a composition comprising 37% true HDI trimers (containing only one isocyanurate ring) and 6.6% true HDI dimers (containing only one uretidinedione ring) is 4694 mPa·s at 25° C., with an average functionality of 3.7.

The process according to the invention makes it possible to obtain products of higher functionality with high degrees of conversion of the monomers while at the same time retaining low viscosities.

The degree of conversion (after trimerization and dimerization) can especially be, after distillation, between 35 and 55% and preferably between 40 and 50%.

By virtue of the invention, it is possible to add to the reaction mixture derived from the dimerization process according to the invention an alcohol, in particular a polyol, preferably of general formula I, or another compound having at least one function other than isocyanate which is reactive with the isocyanate function, and to carry out in sequence a condensation reaction with this compound, in particular a carbamation and/or allophanatation reaction, without destroying the dimer.

Now, as mentioned above, a person skilled in the art would have expected that the uretidinedione ring would have cleaved into two isocyanate molecules capable of reacting with various reagents; the fact that the dimer remains stable under these conditions is entirely surprising, in particular after reaction with an alcohol and distillation under vacuum.

The subject of the invention is thus also a process for the preparation of a polyfunctional isocyanate composition comprising at least one isocyanate dimer containing a uretidinedione unit and at least one other compound having a function derived from the isocyanate function, starting with isocyanate monomers and another monomer compound comprising at least one function other than isocyanate, which is reactive with the isocyanate function, this process comprising the following steps:

i) the starting reaction medium is heated, in the absence of dimerization catalyst, optionally in the presence of a compound of general formula I, II and/or III, to a temperature of greater than at least 50° C., advantageously greater than at least 80° C., preferably greater than at least 120° C., and less than at least 200° C., advantageously less than at least 170° C., for a period of less than 24 hours, advantageously less than 5 hours;

ii) the reaction mixture from step i) containing unreacted isocyanate monomers and a compound comprising at least one function other than the isocyanate function, which is reactive with the isocyanate function, are reacted together, optionally in the presence of a catalyst;

iii) the isocyanate monomers and, where appropriate, the compound comprising at least one function other than the isocyanate function, which is reactive with the isocyanate function, are removed from the reaction mixture from step ii);

iv) the polyfunctional isocyanate composition comprising at least one isocyanate dimer containing a uretidinedione unit and at least one other function derived from the isocyanate function, is isolated.

The expression "derived isocyanate function" is understood to refer in particular to the following functions: carbamate, urea, biuret, urethane, uretidinedione, masked isocyanate and allophanate.

The compound containing a function derived from the isocyanate function can be, in particular, a compound of general formula II or III, as defined above, in which case the compound added to step i) is a compound of general formula I as defined above.

When a final prepolymer composition preferably of polyurethane type is desired, it is particularly advantageous, in order to lower the viscosity of the mixture, to add, at the dimerization stage, to the reaction medium containing the starting monomers, besides the optional compound of general formula I and/or compounds derived therefrom, a chain-extension compound bearing at least two functionalities, in particular a compound of monomeric, oligomeric and/or polymeric nature of diol, diamine or dicarboxylic type.

The subject of the invention is also a process for the preparation of an isocyanate composition comprising at least one isocyanate dimer containing a uretidinedione unit and at least one compound containing a function derived from the isocyanate function, starting with isocyanate monomers and another compound comprising at least one function other than isocyanate, which is reactive with the isocyanate function, this process comprising the following steps:

i) the isocyanate monomers are reacted with a compound comprising at least one function other than an isocyanate function, which is reactive with the isocyanate function, optionally in the presence of a catalyst;

ii) the reaction mixture from step i) containing unreacted isocyanate monomers is heated, in the absence of dimerization catalyst, to a temperature of greater than at least 50° C., advantageously at least 80° C., preferably at least 120° C. and not more than 200° C., advantageously not more than 170° C., for a period of less than 24 hours, advantageously less than 5 hours;

iii) the monomers and, where appropriate, the compound comprising at least one function other than the isocyanate function, which is reactive with the isocyanate function, are removed from the reaction mixture from step ii);

iv) the isocyanate composition comprising at least one polyisocyanate dimer and at least one compound having a function derived from the isocyanate function is isolated.

The reactions in steps ii) and i), respectively, which have just been described above for the two variants of the process according to the invention advantageously consist of reactions of carbamatation, allophanatation, creation of a urea, biuret, urethane or masked isocyanate function or any other function derived from the isocyanate function, obtained by a reaction of the isocyanate function with a reactive function, advantageously of nucleophilic nature.

The compounds having a function derived from the isocyanate function are, in particular, of general formulae II and III described above.

The reactions mentioned above can also take place simultaneously depending on the nucleophilic reactive compound(s) and the reaction conditions used.

Among the preferred processes for the preparation of an isocyanate composition comprising, besides an isocyanate dimer containing a uretidiniedione unit, an isocyanate derivative compound, mention may be made in particular of the processes for the preparation of biurets by reaction, in step ii), or where appropriate in i), of isocyanate monomers with themselves in the presence of water.

Compositions obtained by such a process containing at least one biuret compound and at least one uretidinedione compound are novel and constitute another subject of the invention.

These compositions advantageously contain 3%, preferably at least 10%, even more preferably at least 20%, by weight of biuret.

The compositions according to the invention contain very little or no solvent, not more than 40% by mass relative to the total mass of the composition, advantageously not more than 25%, preferably less than 10%, even more preferably less than 5%, or even less than 1% by mass. In any case, solvent-free compositions are preferred.

In addition, in parallel with the reactions resulting in a compound containing at least one derived isocyanate function, there may also be a (cyclo)trimerization or (cyclo)condensation reaction of the monomers present in the reaction mixture. In this case, the reaction is carried out under suitable conditions in the presence of a (cyclo)trimerization or (cyclo)condensation catalyst.

The compositions thus obtained after removal of the isocyanate monomers and other volatile compound(s) comprising a function which is reactive with the isocyanate function also have a lowered viscosity on account of the presence of isocyanate dimer which acts as reactive diluent.

The process of the invention can be adapted to various aliphatic, cycloaliphatic, araliphatic or aromatic polyisocyanates or to a mixture of these various starting isocyanates which may be mono- to polyfunctional, but preferably difunctional (i.e. containing two isocyanate functions).

If compositions of very low viscosity are sought, diisocyanates containing an aliphatic chain having polymethylene sequences with low branching, which are preferably non-cyclic, will be preferred. These monomers represent at least half, advantageously ⅔ and preferably the total amount, by mass, of the monomers used.

The starting isocyanates can contain other preferred functions which have no reactive hydrogen, in particular carbamate, allophanate, urea, biuret, ester, amide, alkoxysilane, masked isocyanate, etc. functions.

In general, if the starting monomers have not been totally converted into dimer and, where appropriate, into another polyisocyanate, the excess of monomers is removed by a process known to those skilled in the art, such as devolatilization or distillation under vacuum, or according to a process of extraction with a gas in the critical or supercritical state, as described in FR 2,604,433. The temperature at which the monomer is removed depends on the process used and on the vapour pressure temperature of the starting isocyanate.

The final composition will generally comprise less than 1%, advantageously less than 0.5%, by mass of monomers relative to the total mass of the composition.

Furthermore, when the dimer obtained according to the invention bears free isocyanate functions, it can then undergo the same conversions as the parent isocyanate monomer or as the other polyisocyanates bearing isocyanate functions. Thus, the isocyanate functions of the dimer obtained without a catalyst can be converted, as with the other isocyanate functions, into carbamate, allophanate, urea, biuret, etc. functions, depending on the reactions carried out on the isocyanate mixture. The excess of parent isocyanate monomer is then removed according to a process mentioned above.

The subject of the invention is also the use of a compound of general formula I and/or of products derived from this derivative by reaction with a compound bearing an isocyanate function, in particular an aliphatic one, for the preparation of isocyanate dimers from isocyanate monomers, in particular aliphatic ones, with a degree of conversion of at least 2%, advantageously at least 3%, preferably at least 4% of the starting isocyanate functions into uretidinedione functions.

The products in question derived from the compound of general formula I are, in particular, the compounds of general formula II and/or III as defined above.

Certain compounds obtained after carrying out the process of the invention are novel and also constitute a subject thereof.

They can be obtained as intermediates or can be found in the final reaction product.

A first group of these compounds is the one of general formula III as defined above, in which at least one of the groups $NX'_1X''_1$, $NX'_2X''_2$ and $NX'_3X''_3$ represents the group of formula V as defined above, the others representing a group $NX_1H$ with $X_1$, $X'_1X''_1$, $X'_2X''_2$ and $X'_3X''_3$ defined as above and $R^1$ as defined above, i.e. representing a group R with the OH groups substituted, where appropriate, with a group $CO—NX_1H$ or a group of formula V, as defined above.

Advantageously, p is equal to 1 and the compound of general formula III bears one, two, three of four allophanate groups.

Advantageously, R is a $(CH_2)_n$ group with n ranging from 2 to 8, a norbornyl, cyclohexylmethyl or 3,3,5-trimethylcyclohexylmethyl group.

A second group of compounds according to the invention is the one of general formula III as defined above, in which
the groups $NX'_1X''_1$, $NX'_2X''_2$ and $NX'_3X''_3$ are chosen from a group of general formula $NX_1H$, a group of general formula V as defined above, a uretidinedione group of formula IV, an isocyanurate group of formula XI

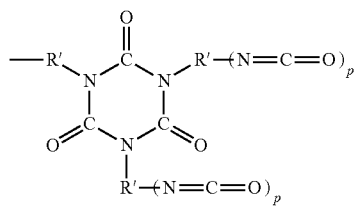

(XI)

R' and p being as defined above,
a biuret group of formula XII

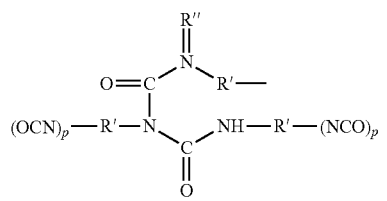

(XII)

with R" representing H or a hydrocarbon residue,
R' and p being as defined above and $R_2$ represents the group R with the OH groups substituted, where appropriate, with a group chosen from $CONHX_1H$, a group of formula VI, a group of formula VI, a group of formula —CO—NH— (group of formula IV), —CO—NH— (group of formula XI) and —CO—NH— (group of formula XII), with the proviso that the compounds containing at least one carbamate group of formula $NX_1H$, or $CONHX_1H$ respectively, and/or allophanate group of formula V, or —CO—NH— (group of formula V) respectively, and at least one group chosen from a uretidinedione group of general formula IV, or —CO—NH— (group of general formula IV), respectively, an isocyanurate group of general formula XI, or —CO—NH— (group of general formula XI) respectively, and a biuret group of general formula XII, or —CO—NH— (group of general formula XII) respectively.

Advantageously, p represents 1 (the starting monomers are diisocyanates).

The compounds in which $R_1$ represents the $CH_2OH$ group are also preferred.

Among the preferred compounds according to the invention, pentaerythritol derivatives comprising one, two, three or four allophanate groups and three, two, one or no carbamate groups are preferred in particular.

Another advantageous group is the one consisting of pentaerythritol derivatives containing a uretidinedione group, the three other OH groups being substituted with carbamate and/or allophanate groups (in particular those containing two carbamate groups and one allophanate group).

Mention may also be made of the corresponding compounds in which the uretidinedione group is replaced with an isocyanurate and/or biuret group.

The corresponding trimethylolpropane homologues also constitute a group of compounds which are advantageous for the purposes of the present invention.

The invention is not limited to liquid compounds of low viscosity, but can lead to compositions in powder form if the starting isocyanate monomers are astutely selected. Thus, if cycloaliphatic diisocyanates are taken, it is possible to obtain mixtures containing at least one compound containing a dimeric function and a compound derived from the conversion of the parent isocyanate monomer in excess, which, after removal of the excess of monomer compounds according to an appropriately selected process described above, makes it possible to obtain compositions in powder form.

The isocyanate compositions of the invention are characterized in that they contain at least one compound derived from the conversion of a dimer obtained according to the process of the invention and at least one compound derived from the conversion of an isocyanate having no dimer functions, it being possible for these compounds optionally to be polyisocyanates whose functions are blocked with protecting groups of different or identical nature, which can then undergo a conversion reaction according to a physical (thermal effect) or chemical or actinic (UV curing, electron beam curing, infrared) process.

The subject of the invention is, in particular, a composition comprising at least one compound of general formula X as defined above and at least one compound of general formula II as defined above and/or at least one compound of general formula III as defined above.

The composition according to the invention also advantageously comprises a compound of formula VIII as defined above.

These products can be used to prepare powdered paints or powdered coating compositions or any other application using the said compositions of the invention derived from the process described.

The compositions obtained according to the process and derived from mixtures of aliphatic isocyanates and cycloaliphatic isocyanates which can lead to powders are also a subject of the invention.

Similarly, the polyurethane mixtures containing at least one compound bearing a dimeric function obtained according to the process described, optionally in powder form, form part of the invention.

The polyisocyanates obtained by the process of the invention are advantageously used as hardeners for the preparation of coatings, in particular polyurethane paints and varnishes, by reaction of the polyisocyanates with a polyol.

Any type of polyol is suitable for this.

However, it has been observed, surprisingly, that certain polyols afford appreciable advantages when they are reacted with polyisocyanates obtained in accordance with the present invention.

These polyols can be of acrylic or polyester nature.

When a polyol of acrylic nature is used, it is preferable for it to satisfy the following conditions for a dry extract (DE) of 75-80% by weight:

Mw (weight-average molecular weight) not greater than 10,000, advantageously not greater than 5000, preferably not greater than 2000.

Mw is preferably less than 10000, advantageously less than 5000, preferably less than 2000.

Mn (number-average molecular weight) of not greater than 5000, advantageously not greater than 3000, preferably not greater than 800.

Mn is preferably less than 5000, advantageously less than 3000, preferably less than 800.

Mw/Mn (dispersity ratio) of not greater than 5, advantageously not greater than 3, preferably not greater than 2.

Mw/Mn is preferably less than 5, advantageously less than 3, preferably less than 2.

number of OHs/molecule of greater than or equal to 2, advantageously greater than 2.

For further details, reference may be made to ASTM standard E222.

The Mn and Mw values are advantageously obtained by gel permeation exclusion chromatography using styrene as standard.

Polyols obtained by polymerization of hydroxyalkyl (meth)acrylates, in particular hydroxyethyl (meth)acrylates and hydroxypropyl (meth)acrylates, are preferred.

The resins sold under the names Joncryl SCX 922 (Johnson Polymers) and Synocure 866 SD (Cray Valley) are most particularly preferred.

When the polyols are of polyester nature, the preferred ones are those having 100% DE and a viscosity of not greater than 10,000 mPa·s, advantageously not greater than 5000 mPa·s, preferably not greater than 1000 mPa·s, the Mw of which is generally between 250 and 8000.

In order to obtain a satisfactory viscosity, it is also possible to add a reactive solvent (other than a true dimer) to the polyol before or after mixing with the polyisocyanate.

Advantageously, an amount of reactive diluent of not greater than 30%, advantageously not greater than 20%, preferably not greater than 10%, by mass relative to the dry mass of the polyol is used.

Considerable advantages in terms of properties of the final coating are already obtained for an amount of reactive solvent of less than 10% by weight. These properties, in particular the speed of drying, the hardness of the coating and the impact strength, are also excellent when the amount of reactive solvent is lowered, even the absence of reactive solvents.

Another subject of the invention consists of compositions for simultaneous or successive application, comprising:
a polyisocyanate obtained by the process of the invention, and
a polyol as defined above.

The compositions obtained by the process of the invention can be used in aqueous coating formulations, by being placed in suspension, in emulsion or in dispersion, or dissolved by grafting hydrophilic agents or by addition of surfactant compounds.

The compositions of the invention can undergo a temporary partial or total masking reaction of the isocyanate functions with one or a mixture of masking agents.

The isocyanate functions can then be restored by application of a physicochemical process such as increasing the temperature, or can be transformed or polymerized by application of a physicochemical process such as ultraviolet radiation.

The compositions according to the invention can also be in the form of suspensions.

They can also comprise the components described below:
optionally, one or more inorganic or organic compound(s) having a pigmentation or filler function, a matt-effect agent or any other additive intended to facilitate the application of the coating or to improve the properties of the coating, such as, for example, a spreading agent, a "cicatrizing" agent, etc.

optionally, one or more catalysts, optionally, one or more surface agents allowing an improvement in the implementation of the formulation, such as, for example, an agent with surfactant properties, an antifoaming agent, a solvent or an aqueous solution whose pH is optionally adjusted.

These compositions have applications in various fields, such as coatings, foams, spreads, adhesive construction materials, glues, in the coating industry, in cosmetics, in medical or agrochemical applications, so-called active principle formulations, etc.

The examples below illustrate the invention.

Except where otherwise mentioned, the percentages are given by weight.

EXAMPLE 1

Formation Kinetics for the Hexamethylene Diisocyanate (HDI) Dimer by Heating to 140° C.

300 g of HDI are introduced, with stirring, into a 500 ml reactor fitted with a condenser and heated by an oil bath.

The reaction medium is brought to 140° C. and the HDI dimer formed after 1, 2, 3, 4, 5 and 6 hours is measured.

The results are given in the table below:

| Species | 1 hour (%) | 2 hours (%) | 3 hours (%) | 4 hours (%) | 5 hours (%) | 6 hours (%) |
|---|---|---|---|---|---|---|
| HDI | 97.8 | 96.7 | 95.6 | 94.7 | 94.1 | 93.4 |
| Dimer | 1.5 | 2.5 | 3.4 | 4.1 | 4.7 | 5.1 |
| Biuret | 0.5 | 0.6 | 0.7 | 0.9 | 0.9 | 1.1 |
| Heavy | 0.2 | 0.2 | 0.3 | 0.3 | 0.3 | 0.4 |

EXAMPLE 2

Formation Kinetics for the Hexamethylene Diisocyanate (HDI) Dimer by Heating to 150° C.

350 g of HDI are introduced, with stirring, into a 0.5 l jacketed reactor heated using a Huber bath, with temperature regulation using an external probe. The reaction mixture is heated to 150° C. and samples are taken at 2 hours 30, 5 hours and 7 hours 30.

The dimer is assayed by IR (infrared). The results are as follows:

TABLE 1

| Reaction time | Amount of HDI dimer (in %) |
|---|---|
| Start | 0.08 |
| 2 hours 30 | 4.6 |
| 5 hours | 5.8 |
| 7 hours 30 | 6.2 |

EXAMPLE 3

Formation Kinetics for the HDI Dimer at 160° C.

The process is performed as in Example 1, except that 300 g of HDI are added and the reaction medium is brought to a temperature of 160° C. The HDI dimer is assayed at 30 minutes, 1 hour, 1 hour 30, 2 hours, 2 hours 30 and 3 hours.

The results are given in the table below:

TABLE 2

| Start | % of HDI dimer obtained | Residual HDI (%) | Biuret (%) | Heavy |
|---|---|---|---|---|
| 30 minutes | 2.4 | 97.3 | 0.3 | — |
| 1 hour | 3.5 | 95.8 | 0.5 | 0.2 |
| 1 hour 30 | 4.2 | 95.0 | 0.6 | 0.2 |
| 2 hours | 4.4 | 94.6 | 0.7 | 0.3 |
| 2 hours 30 | 4.6 | 94.3 | 0.8 | 0.3 |
| 3 hours | 4.8 | 93.9 | 0.9 | 0.4 |

EXAMPLE 4

Preparation of a Hexamethylene Diisocyanate Trimer (HDT) Composition Comprising HDI Dimer 1000 g of HDI are introduced, with stirring, into a 1 litre reactor fitted with a condensing column and heated using an oil bath.

The reaction medium is heated for 1 hour 30 at 160° C. 10 g (1% by weight) of HMDZ (hexamethyldisilazane) are then added. The reaction medium is heated for 30 minutes at 140° C. and then cooled. When the temperature reaches 88° C., 5.5 g of n-butanol are added. After reaction for one hour, the product is purified by distillation under vacuum. The following results are obtained:

TABLE 3

| Species | Heating for 1 h 30 at 160° C. | HMDZ trimerization, blocking with butanol | Distillation (residues) | Distillation (product recovered) |
|---|---|---|---|---|
| HDI | 95.2% | 76.0% | 94.1% | 0.5% |
| Butyl monocarbamate | — | 0.9% | 1.1% | 0.8% |
| Dimer | 4.3% | 3.7% | 1.0% | 14.2% |
| Trimer | 0.5%* | 13.2% | 2.7% | 56.3% |
| Bis-trimer | | 4.6% | 0.9% | 20.6% |
| Heavy | | 1.6% | 0.2% | 7.6% |

*For the starting sample, the 0.5% corresponds to biuret (mainly) and bis-dimer.
The heavy fractions are compatibilized as tris-trimer. The bis-trimer (main compound) peak comprises tetramers (trimer-dimer) and imino-trimer.
The resulting composition has a viscosity at 25° C. of 509 cps (509 mPa · s).

EXAMPLE 5

Synthesis of a Polyisocyanate Based on HDI Isocyanurate Trimer and HDI Dimer 1000 g of HDI are fed into a reactor which is heated for 3 hours with stirring at 150° C. in order to form the dimer, without a dimerization catalyst. The DC (degree of conversion) of HDI, measured by assaying the isocyanate functions, is 5.1%. The temperature of the reaction medium is reduced to 130° C. and 10 g of hexamethyldisilazane are added to the reaction medium. The temperature of the reaction medium is then brought to 140° C. The trimerization reaction is carried out for 1 h 50. The overall degree of conversion of the HDI is 38%, measured by the method of assaying the isocyanate functions. The catalyst is destroyed by addition of n-butanol (4.6 g) at 80° C. After 20 minutes, the reaction mixture is purified by distillation under vacuum of the excess monomers, and gives 320 g of a polyisocyanate mixture with a viscosity of 935 mPa·s at 25° C., an NCO titre (as moles of NCO per 100 g of compound) of 0.54 and a functionality of 3.3.

The composition is given in the table below.

| Species | % by weight |
|---|---|
| HDI | 0.24 |
| N-butyl HDI monocarbamate | 0.5 |
| True HDI dimer | 11.3 |
| True HDI trimer | 51.3 |
| Bis-trimer | 25.2 |
| Heavy | 11.46 |

EXAMPLE 6

Synthesis of a Polyisocyanate Based on HDI Isocyanurate Trimer and HDI Dimer 2017 g of HDI are fed into a reactor which is heated for 3 hours with stirring at 150° C. in order to form the dimer. The DC of HDI, measured by assaying the isocyanate functions, is 4.9%. The temperature of the reaction medium is reduced to 110° C. and 24.2 g of hexamethyldisilazane are added to the reaction medium. The temperature of the reaction medium is then brought to 140° C. The trimerization reaction is carried out for 2 h 15. The overall degree of conversion of the HDI is 44.4%, measured by the method of assaying the isocyanate functions. The catalyst is destroyed by addition of n-butanol (11.1 g) at 80° C. After 20 minutes, the reaction mixture is purified by distillation under vacuum of the excess monomers, and gives 765 g of a polyisocyanate mixture with a viscosity of 1848 mPa·s at 25° C., an NCO titre (as moles of NCO per 100 g of compound) of 0.52 and a functionality of 3.55.

The composition is given in the table below.

| Species | % by weight |
|---|---|
| HDI | 0.2 |
| N-butyl HDI monocarbamate | 0.3 |
| True HDI dimer | 7.6 |
| True HDI trimer | 46.2 |
| Bis-trimer | 25.1 |
| Heavy | 20.2 |

The standard polyisocyanate (comparative Example 8) has a much higher viscosity (30% higher for Example 6 and 2.5 times as high for Example 5) than the polyisocyanate mixture obtained according to the invention, this being for a much lower degree of conversion of HDI.

The beneficial effect of carrying out the dimerization reaction without a dimerization catalyst before the trimerization reaction is thus shown.

This also shows that the trimerization catalyst is not deactivated by the presence of HDI dimer since the degree of conversion of the HDI is high, this being for the same amount of catalyst, or even a slightly lower amount.

EXAMPLE 7

Synthesis of a Polyisocyanate Based on HDI Isocyanurate Trimer and HDI Dimer

The process is performed as in Example 5, except that 1104 g of HDI are used. The trimerization is carried out with 43 g of HMDZ catalyst and is stopped by addition of 15.2 g of n-butanol when the degree of conversion of the HDI, measured by assaying the isocyanate functions, is 53%.

After distillation of the starting monomers, the polyisocyanate mixture has a viscosity of 4694 mPa·s at 25° C., an NCO titre (as moles of NCO per 100 g of compound) of 0.50 and a functionality of 3.7.

The standard mixture (comparative Example 9) has a much higher viscosity (2.5 times as high) than the polyisocyanate mixture obtained according to the invention, this being for a much lower degree of conversion of HDI.

The beneficial effect of carrying out the dimerization reaction without a dimerization catalyst before the trimerization reaction is thus shown.

This also shows that the trimerization catalyst is not deactivated by the presence of HDI dimer since the degree of conversion of the HDI is high.

EXAMPLE 8

Synthesis of a Standard HDT Polyisocyanate (Comparative Example)

A standard trimerization reaction is carried out on 5 kg of HDI using 1.2% (weight/weight) of hexamethyldisilazane as catalyst at 120° C. for 2 h 30 without carrying out the dimerization reaction before or after the trimerization reaction. The degree of conversion (DC) of the HDI is about 30%. After blocking the catalyst with n-butanol and elimination of the HDI by distillation under vacuum, a product is obtained which has a viscosity of 2400 mPa·s, an NCO titre (as moles of NCO per 100 g of compound) of 0.52 and a functionality of 3.4.

EXAMPLE 9

Synthesis of a High-viscosity HDT Polyisocyanate (Comparative Example)

The process is performed as in Example 7, but 1400 g of HDI and 2.5% by weight of HMDZ catalyst are used. The reaction is carried out at 120° C. for 2 h 15 without carrying out the dimerization reaction before or after the trimerization reaction. The cyclotrimerization is stopped when the degree of conversion of the HDI is 54%, by addition of 20 ml of n-butanol at 80° C. After removal of the HDI by distillation under vacuum, an HDT product is obtained which has a viscosity of 12,700 mPa·s and an NCO titre (as moles of NCO per 100 g of compound) of 0.48.

EXAMPLE 10

Preparation of a Hexamethylene Diisocyanate Trimer (HDT) Composition Comprising HDI Dimer In a plant identical to the one in Example 3, 900 g of HDI and 9 g of HMDZ (1% by weight) are added. The reaction medium is heated at 140° C. for 30 minutes and then, without blocking the reaction, it is heated at 150° C. for 2 hours 30 in order to prepare the dimer. At the end of the reaction, the monomers are evaporated off. 240 g of final product are recovered. The degree of conversion of the HDI is 17.9% after 30 minutes at 140° C. and 33.6% after 2 hours 30 at 150° C.

The results of the analyses of the composition of the reaction medium are given in Table 4 below.

TABLE 4

| Species | After reaction for 30 minutes (trimerization) | After heating at 150° C. for 2 hours 30 (dimerization before distillation) |
|---|---|---|
| HDI | 82.1% | 66.4% |
| Dimer | 0.82% | 3.0% |
| Trimer | 12.7% | 18.1% |
| Imino-trimer | 0.73% | 0.86% |
| Bis-trimer | 2.8% | 7.6% |
| Heavy | 0.63% | 3.7% |

The final polyisocyanate composition has, after distillation of the monomers, a viscosity at 25° C. of 1200 cps (1200 mPa·s).

EXAMPLE 11

Comparative Study of the Formation Kinetics for the NBDI Dimer and the HDI Dimer In the same way as in Example 3, NBDI dimer was prepared by heating NBDI to 160° C.

The results are given in the table below:

| Time in min | % NBDI dimer at 160° C. | % HDI dimer at 160° C. |
|---|---|---|
| 0 | 0 | 0 |
| 30 | 2.6 | 2.4 |
| 60 | 3.75 | 3.5 |
| 90 | 4.17 | 4.2 |
| 120 | 4.25 | 4.4 |
| 150 | 4.45 | 4.6 |
| 180 | 4.35 | 4.8 |

The respective formation kinetics for the HDI dimer and the NBDI dimer are illustrated in the attached FIGURE.

It is observed that NBDI is of comparable reactivity to HDI as regards the dimerization without catalyst.

EXAMPLE 12

Synthesis of a Mixture of HDI Biuret (HDB) and HDI Dimer 1000 g of HDI are heated for 3 hours at 150° in order to carry out a dimerization reaction (5% DC of HDI). A biuret polyisocyanate is synthesized with the mixture obtained, as described in patent application FR 86/12524 (now patent FR 2,603,278) Rhône-Poulenc.

After reaction (DC of HDI of 45%), the HDI monomer and the other volatile compounds (solvents/acid catalyst) are removed under vacuum. The polyisocyanate mixture contains biuret and true dimer (15% by weight) and has a viscosity of 4500 mPa·s at 25° C. and an NCO titre (as moles of NCO per 100 g of compound) of 0.53.

For comparative purposes, a standard HDB polyisocyanate (commercial product) obtained by the same process as the one described in the abovementioned patent, without dimerization reaction before or after the biuretization reaction, has a viscosity of 9000 mPa·s at 25° C. and an NCO titre (as moles of NCO per 100 g of compound) of 0.52.

The standard HDB product thus has a much higher viscosity (twice as high) than the polyisocyanate mixture obtained by the sequence dimerization-biuretization process.

This also shows that the biuretization catalyst is not deactivated by the presence of HDI dimer.

EXAMPLE 13

Preparation of a Composition of Isophorone Diisocyanate (IPDI) Dimer and Pentaerythritol IPDI Carbamate 300 g of IPDI and 0.75 g of pentaerythritol are heated in a reactor at 150° C. for 7 hours.

The reaction mixture obtained is analysed and the formation of 2.3% by weight of IPDI dimer and 2.5% by weight of pentaerythrityl IPDI carbamate is found.

EXAMPLE 14

Preparation of a Composition of HDI Dimer/Pentaerythrityl HDI Carbamate Prepolymer 4942.3 g of HDI and 100.1 g of pentaerythritol are introduced successively, at room temperature and under an inert atmosphere of nitrogen, into a 6 l thermostatically-controlled reactor equipped with a semi-lunar stirrer, a condenser and a dropping funnel.

The reaction medium is stirred and heated gradually to a temperature of 140° C. After 1 h 50, infrared analysis on a sample of the reaction mass indicates the presence of allophanate, carbamate and dimer peaks. After 2 h 35 at 140° C., the medium becomes translucent with the presence of insoluble material. After reaction for 4 h 20, infrared analysis on a sample of reaction mass indicates the presence of allophanate and carbamate peaks and a strong peak due to the dimer. After reaction for 5 h 11 at about 140° C., the heating is stopped and the reaction medium is allowed to cool. The insoluble material (recovered mass of 3.7 g) is filtered off and the solution thus filtered is distilled on a scraping film under a vacuum of 0.5 to 1 mbar, at a temperature of 160° C. and with a feed flow rate of between 1200 and 2300 ml per hour. The product recovered (1340 ml) is distilled a second time under the same conditions, except that the feed flow rate is reduced (flow rate of between 500 and 1200 ml per hour). The mass of product recovered is 819 g. The titre of NCO functions is 0.499 mol per 100 g of mixture, the percentage of residual HDI monomer is about 2%. This mixture then undergoes a third distillation. 742.7 g of polyisocyanate composition is thus recovered, in which the titre of NCO functions is 0.482 mol per 100 g of the mixture, i.e. a mass percentage of 20.24%, the percentage of residual HDI, monomer is 0.16% and the viscosity of the final crude mixture is 11,544 mPa·s at 25° C.

The composition of the mixture is determined after separative chromatography and structural analysis by infrared on the fractions eluted.

| Product identified in the composition | Amount measured in % |
| --- | --- |
| Residual HDI | 0.11 |
| True dimer | 20.2 |
| True bis-dimer* | 0.65 |
| True HDI carbamate** | 33.2 |
| Pentamers*** | 18.3 |
| Heavy**** | 27.54 |
| Biuret | Less than 0.5 |
| Detectable hydroxyl functions | 0 |

*The true bis-dimer is calculated on the specific bis-dimer trace.
**The true HDI carbamate has a molecular mass of 808 and is represented by the following structure

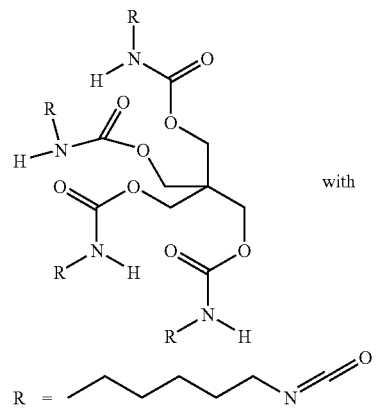

with

*** The band for pentamers corresponds to a mixture of pentaerythrityl HDI carbamate dimer (1), with a molecular mass of 976 and a functionality of 4, and of pentaerythrityl HDI allophanate (2) with a molecular mass of 976 and a functionality of 5.

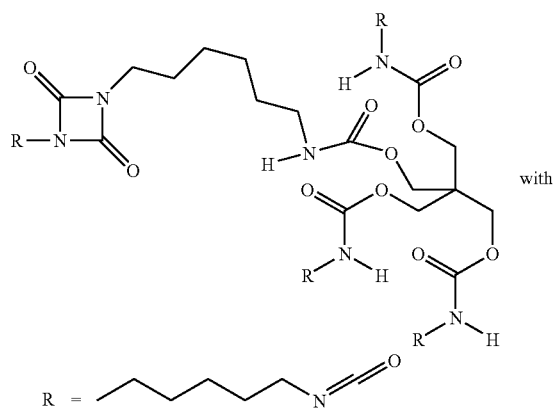

Molecule 1

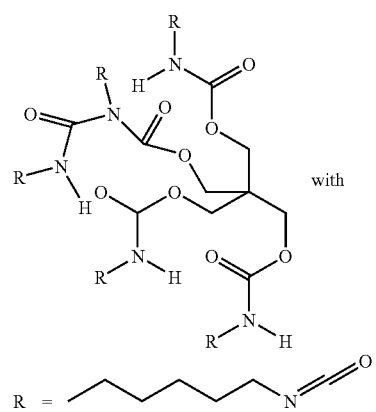

Molecule 2

**** The heavy fractions have carbamate, allophanate and dimer peaks.

The final composition after distillation of the HDI has an average functionality of 4 for a concentration of 80% by mass of HDI and pentaerythritol derivatives and of 20% dimers, this being for a very low viscosity for this type of prepolymer.

EXAMPLE 15

Preparation of a Composition of HDI Dimer/HDI and Pentaerythritol Prepolymer

The same procedure as in Example 14 is repeated.

The process is performed with 148.2 g of HDI and 3.042 g of pentaerythritol with a reaction medium temperature of 120° C.

Infrared analysis carried out after reaction for 1 h 50, indicates the presence of carbamate, allophanate and dimer functions. The peak for the dimer functions is larger than the peak corresponding to the carbamate/allophanate functions, which indicates a large amount of dimer.

EXAMPLE 16

Preparation of a Composition of HDI Dimer/HDI and Pentaerythritol Prepolymer

The same procedure as in Example 14 is repeated.

The process is performed with 148.5 g of HDI and 3.068 g of pentaerythritol with a reaction medium temperature of 160° C.

Infrared analysis carried out after reaction for 1 h 28, indicates the presence of carbamate, allophanate and dimer functions. This time, the peaks corresponding to the carbamate/allophanate functions are of stronger intensity than the peaks for the dimer functions, which indicates that less dimer is formed at high temperature.

EXAMPLE 17

Preparation of a Composition of HDI Dimer/HDI and Pentaerythritol Prepolymer

The same procedure as in Example 14 is repeated.

This time, the process is performed with an HDI/OH ratio=5. 148.6 g of HDI and 6.016 g of pentaerythritol are fed in, with a reaction medium temperature of between 137 and 143° C.

Infrared analysis performed after reaction for 2 h 35, indicates the presence of carbamate, allophanate and dimer functions. This time, the peaks corresponding to the carbamate/allophanate functions are of stronger intensity than the peaks for the dimer functions, which indicates that less dimer is formed.

EXAMPLE 18

Preparation of a Composition of HDI Dimer/HDI and Pentaerythritol Prepolymer

The same procedure as in Example 14 is repeated.

149.53 g of HDI and 1.523 g of pentaerythritol are fed in. The reaction is carried out at a reaction medium temperature of about 152° C. for 7 h 30.

Infrared analysis indicates the presence of peaks corresponding to the carbamate/allophanate functions, and dimers.

EXAMPLE 19

Preparation of a Composition of HDI Dimer/HDI and Trimethylolpropane Prepolymer

The same procedure as in Example 14 is repeated.

This time, the process is performed with trimethylolpropane. 151.01 g of HDI and 4.08 g of trimethylolpropane are fed in. It is necessary to work at a higher reaction temperature in order to see the formation of dimer in an appreciable amount. The reaction medium temperature is between 140° C. and 160° C.

Infrared analysis indicates the presence of peaks corresponding to the carbamate/allophanate functions, and dimers.

EXAMPLE 20

Comparative Example 2101.5 g of HDI and 299.15 g of 4,4'-isopropylidenedicyclohexanol are successively introduced into a 3 l reactor equipped as in Example 14. The reaction mixture is heated for 1 h at 80° C. and for 45 minutes at about 102° C. The product obtained is "louvated" twice at a temperature of 160° C. and at 0.5 mbar. The product recovered has a titre of NCO functions of 0.288, i.e. 12.1%, and a titre of residual HDI monomer of 0.02%. The viscosity of the mixture could not be measured since the product is too viscous.

Infrared analysis indicates that the amount if dimeric functions in the product obtained is relatively low. At this temperature, it is convenient to carry out the reaction for longer periods in order to obtain substantial amounts of dimers in the absence of pentaerythritol-type promoter.

This example shows that the polyurethanes containing isocyanate functions obtained according to a standard process give viscous polyisocyanate compositions.

Examples of Formulations

EXAMPLE 21

A varnish formulation was prepared using the composition obtained in Example 14.

To do this, a mixture of two polyols sold by the company Jäger was used. The dry extract (DE) is 90% and the titre of hydroxyl functions (% OH) is 3.97 (by mass relative to the dry mass).

This polyol mixture was selected for its low structuring properties and its capacities to reduce the supply of solvent in the formulation, out of concern to lower the content of volatile organic compounds (VOCs).

Two formulations were prepared: one with 0.05% of catalyst (DBTL), and the other without catalyst.

| Components | A | B |
| --- | --- | --- |
| Jagotex F262/Jagapol PE350 (50/50 by mass) | 44.06 | 43.99 |
| Composition of Example 14 | 20.20 | 20.28 |
| DBTL (10% in BuAc/EEP = 3-ethyl ethoxy propionate 8:2) | 0 | 0.30 |
| Solvent (BuAc/Solvesso 100 6:4) | 35.38 | 35.61 |

The viscosity adjustment was made using the Ford No. 4 fraction, such that there are about 25 seconds on the composition before application.

The applications were made using a film-drawer with a 200 μm applicator bar (wet) on a glass plate.

Drying took place in the following way:

Plates A: 30 min of drying at room temperature and then 3 hours at 100° C.

Plates B: 30 min of drying at room temperature and then 1 hour at 100° C.

The films obtained have good tautness (slight orange-peel appearance) and have no other surface defect elsewhere.

The hardness of the film was measured 4 and 7 days after application according to NFT standard 30-016 (Persoz pendulum).

Results:

| Plates | A | B |
|---|---|---|
| % DE | 59.9 | 59.9 |
| VOC (g/l) | 387 | 387 |
| Pot-life | 30 h | 1 h 20 |
| Persoz hardness | | |
| To + 4d (T = 21.5° C., Hr = 55%) | 159 | 190 |
| To + 7d (T = 21.2° C., Hr = 40%) | 170 | 188 |

It is noted that the VOC values are very low and are below the required regulatory values.

EXAMPLE 22

A varnish formulation was prepared using the composition obtained in Example 4, by mixing together the following ingredients (in parts by weight)

| | |
|---|---|
| Polyisocyanate of Ex. 4: | 23 |
| Synocure 866 SD: | 65 |
| Solvent (AcBu/Solvesso 100: 60/40): | 14 |
| DBTL (1/1000 in Solvesso 100): | 18 |

The VOC content of the composition was 418 g/l.

The varnish was applied with a 200 μm gauge to glass plates.

The Persoz hardness was measured after 1, 3 and 7 days of drying in an air-conditioned room at room temperature (RT) on films which had not been oven-treated beforehand and on films which had been kept at 60° C. for 30 minutes.

The results are as follows:

| Test | Persoz hardness |
|---|---|
| To + 24 h (R.T.) | 52 |
| To + 24 h (30 min, 60° C.) | 69 |
| To + 3 d (R.T.) | 167 |
| To + 3 d (30 min, 60° C.) | 183 |
| To + 7 d (R.T.) | 205 |
| To + 7 d (30 min, 60° C.) | 230 |

The polyurethane coatings obtained have excellent resistance to methyl ethyl ketone and to acids.

The invention claimed is:

1. A low-viscosity polyfunctional isocyanate composition comprising at least one uretidinedione isocyanate dimer and at least one trimer having a biuret function, wherein said biuret function containing trimer represents at least 10% by weight based on the weight of the composition and the ratio of true dimer units to the total composition is less than 15% on a mass/mass basis.

2. A low-viscosity polyfunctional isocyanate composition comprising at least one uretidinedione isocyanate dimer and at least one trimer having a biuret function, wherein said biuret function containing trimer represents at least 20% by weight based on the weight of the composition and the ratio of true dimer units to the total composition is less than 15% on a mass/mass basis.

3. A composition comprising:
    (a) at least one polyisocyanate composition according to claim 2; and
    (b) a polyol.

4. A composition comprising:
    (a) at least one polyisocyanate composition according to claim 2; and
    (b) an acrylate polyol which satisfies the following conditions for a dry extract:
        (i) Mw (weight-average molecular weight) not greater than 10,000;
        (ii) Mn (number-average molecular weight) of not greater than 5000;
        (iii) Mw/Mn (dispersity ratio) of not greater than 5; and
        (iv) number of OHs/molecule of greater than or equal to 2.

5. A composition comprising:
    (a) at least one polyisocyanate composition according to claim 2; and
    (b) a polyester polyol having a viscosity of not greater than 10,000 mPa·s at 25° C., and an Mw of between 250 and 8000.

6. A composition according to claim 3, further comprising a crosslinking catalyst.

7. A composition according to claim 6 wherein the crosslinking catalyst is a latent catalyst.

* * * * *